United States Patent [19]
Gelbenegger

[11] 3,739,404
[45] June 19, 1973

[54] BRAKED JOINT FOR PROSTHESES AND ORTHOSES

[75] Inventor: Franz Gelbenegger, Hamburg-Volksdorf, Germany

[73] Assignee: IPOS Kommanditgesellschaft, Luneburg, Germany

[22] Filed: Nov. 29, 1971

[21] Appl. No.: 202,978

[30] Foreign Application Priority Data
Jan. 5, 1971 Germany................ P 21 00 261.9

[52] U.S. Cl. ................ 3/27, 3/28, 3/29, 128/80 F
[51] Int. Cl............................ A61f 1/04, A61f 1/08
[58] Field of Search ................................. 3/22–29, 3/2; 128/80 C, 80 F, 80 R

[56] References Cited
UNITED STATES PATENTS
2,853,712  9/1958  Bach......................................... 3/27

FOREIGN PATENTS OR APPLICATIONS
175,193  2/1922  Great Britain............................ 3/27
233,950  5/1925  Great Britain............................ 3/27
416,341  9/1934  Great Britain............................ 3/28

*Primary Examiner*—Richard A. Gaudet
*Assistant Examiner*—Ronald L. Frinks
*Attorney*—Ernest F. Marmorek

[57] ABSTRACT

A braked joint for artificial limbs of prostheses and orthoses comprising a shaft rigidly mounted on one of the limb members and a brake cable wrapped around the shaft and mounted with its ends at the other of the limb members in an adjustable spring bias arrangement allowing to selectively adjust any desired motion resistance against pivotal movement of the limb members.

3 Claims, 1 Drawing Figure

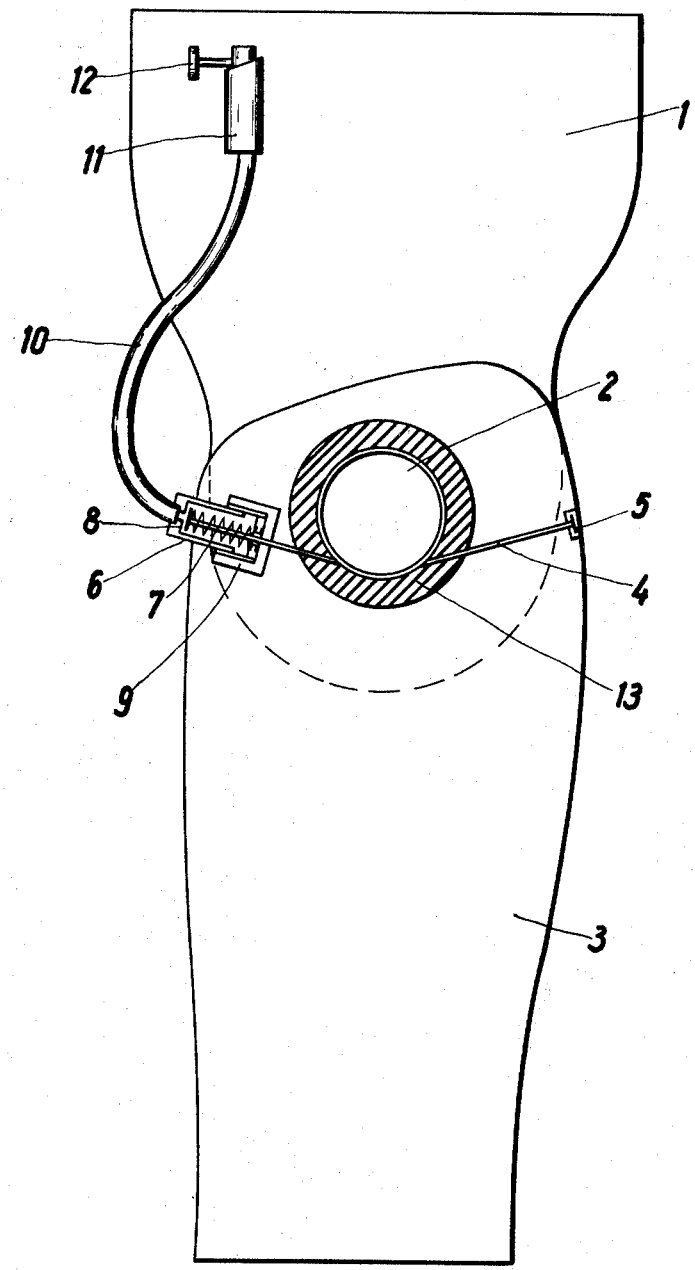

BRAKED JOINT FOR PROSTHESES AND ORTHOSES

The present invention relates to a brake device of a type used in the field of technical orthopedics to control the resistances against movements as well as to mutually lock artificial limb members under the influence of spring bias and spring loading.

In comparable prior art devices are generally employed friction linings in bearing brakes, wedge-type brakes, simple strap brakes and summation brakes in which the brake lining is adhesively attached to a steel strap. Although brake systems of this type with the exception of the wedge brake may influence the resistances in an artificial joint these systems cannot mutually lock the artificial limb members but through a substantial brake weight G. In a wedge brake system locking of the artificial limb members may be obtained with a relatively small brake weight, subsequent to the braking action, however, the brake wedges must be urged apart by means of counter springs and there is the risk of blocking. For interlocking artificial limb members are predominantly employed mechanical locking mechanisms which require a relatively strong force for releasing the mechanism and have long closing paths which raise problems for the patient using such artificial limbs.

It is therefore the object of the present invention to provide a novel and improved brake device allowing selective predetermined motion resistances until a mutual locking of the limb members is effected. This object may be achieved according to the present invention as follows:

A shaft is mounted in one of the artificial limb members and a flexible brake cable is wrapped around this shaft in a full convolution with an angle of grip of at least 360° ($\alpha = 360°$) and the ends of this convolution are attached to the other of the two limb members in such a manner resulting in a tensional stress being developed in the cable under a radial load applied to the braked joint whereby the brake cable ends are spring biased in a mounting. The bias force in the brake cable is adjustable and may additionally be increased by means of a lever to such a degree that the braking moment attains a value at which the two limb members are mutually interlocked.

Preferably the brake cable is wrapped around the shaft in at least one full winding or convolution or in several helically arranged convolutions. The brake cable must be suitable to withstand the tensional forces applied.

In the following, a preferred illustrative embodiment of the present invention will be explained with reference to the appended drawing:

A shaft 2 is mounted in the thigh member 1 of a thigh prosthesis, and the thigh member is pivotably connected to the shank member 3. A brake cable 4 is wrapped around the shaft 2 and is anchored at its one end at the shank member 3 in a mounting 5 and is spring biased at its other end in the mounting 6 which is likewise attached to the shank member 3. The tension force of the biasing spring 7 which is received in a guide cup 8 may be adjusted externally by means of an adjusting screw 9. A Bowden control cable 10 which extends to the thigh member 1 and is mounted at the thigh member in an axial advance cam 11 in a manner allowing to readily increase the spring bias by means of an adjustable lever 12 allows to fix the relative positions of the two limb members 1 and 3.

The shaft 2 is furthermore mounted in a resilient bearing 13 in the shank member 3 so that nay radial loading of the braked joint results in a tensional force being applied to the spring 7 whereby the friction between brake cable 4 and shaft 2 is increased.

As may be seen by the foregoing description, any desired motion resistance may be preselected, the artificial joint may be locked by means of the brake and any loading of the joint by the weight of the body of the bearer results in an increase of the motion resistance. A high brake efficiency may be obtained for small spring movements and in dependence upon the number of convolutions or the total angle of grip $\alpha$. When no load is applied to the spring the limb members may be pivoted freely without any resistance.

The above described brake device may be readily produced and at low cost.

What is claimed is:

1. A braked joint for a prosthesis or an orthosis having two artificial limb members joined by a rigid shaft which is firmly connected to one limb member,
   comprising, in combination,
   elastic bearing means provided in the other limb member for elastically supporting said shaft,
   a frictional cable coiled around said shaft to form at least one complete winding defining a loop having an angle of 360°, one end of said cable being connected to said other limb member,
   spring means mounted on said other limb member for resiliently tensioning the other end of said cable in such a manner that upon applying a radial load to the shaft by said one limb member the cable exerts a frictional braking which is proportional to the resilient tension of said spring means and to the load.

2. A braked joint according to claim 1 further including adjusting means between said other limb member and said spring means for adjusting the bias of said spring means.

3. A braked joint according to claim 2 further including control lever means coupled to said adjusting means and operable to increase the bias of said spring means to such a degree that the cable loop firmly clamps said shaft.

* * * * *